Jan. 7, 1958  H. C. KARCHER  2,818,704
TURBINE ENGINE STARTING SYSTEM
Filed Oct. 30, 1952  3 Sheets-Sheet 3
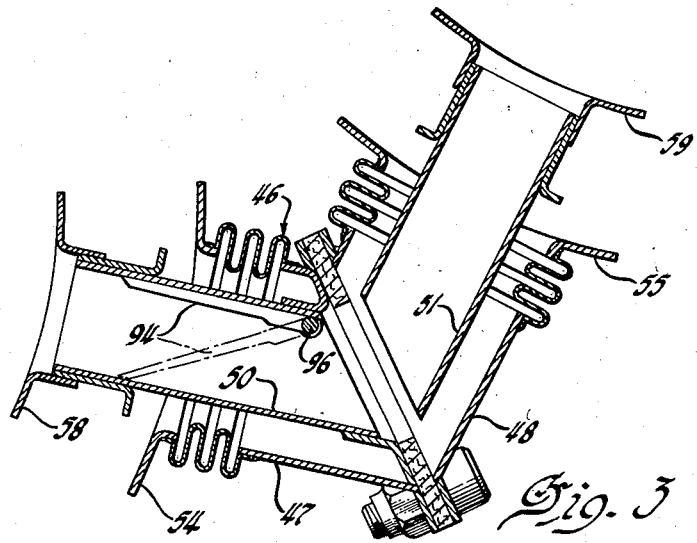
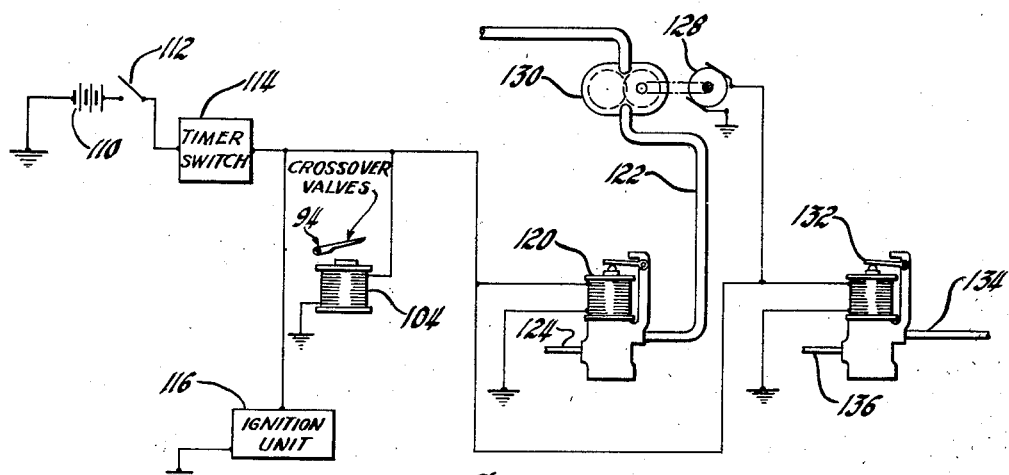
INVENTOR
Harry C. Karcher
BY
Willits, Helwig & Baillie United States Patent Office 2,818,704
Patented Jan. 7, 1958

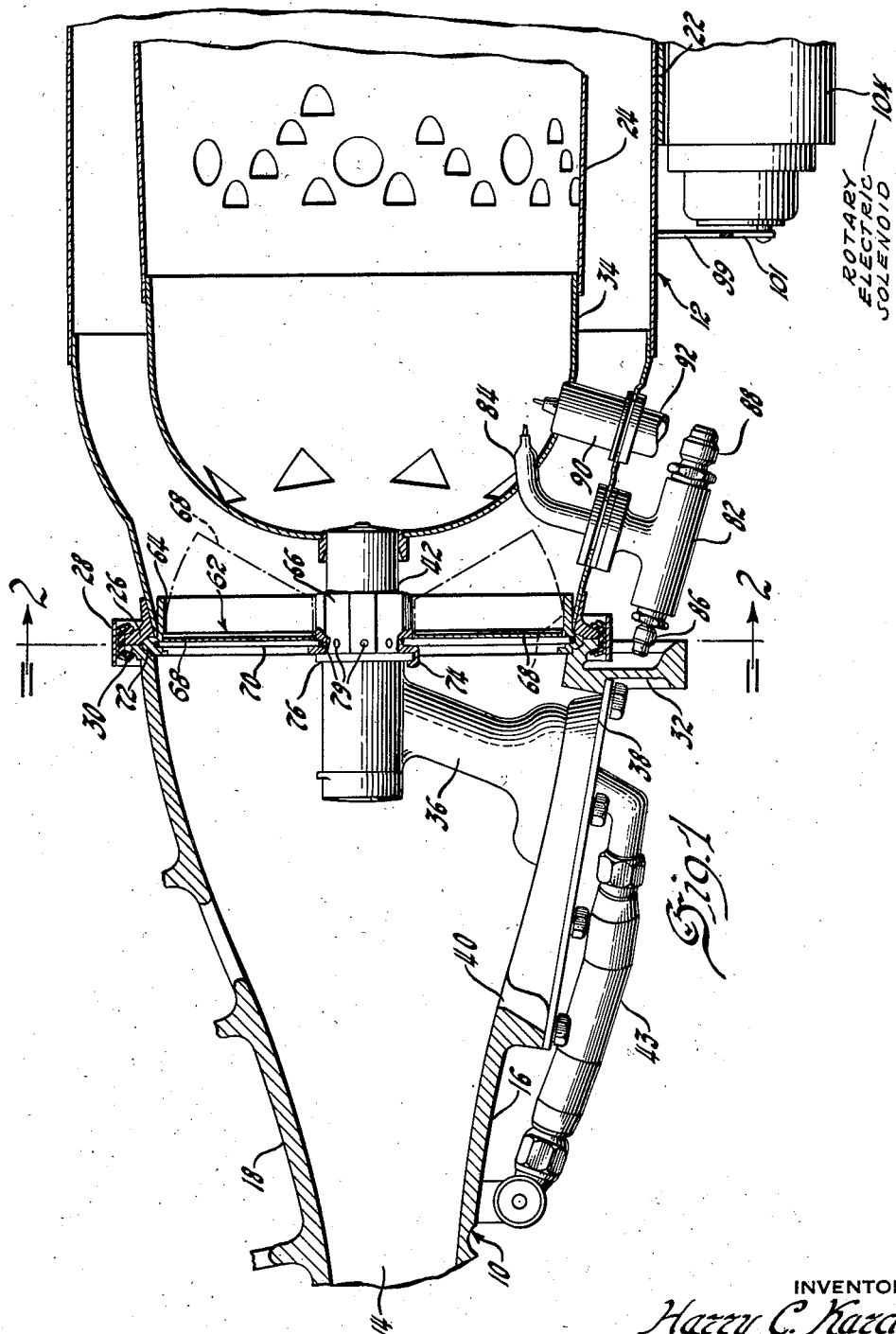

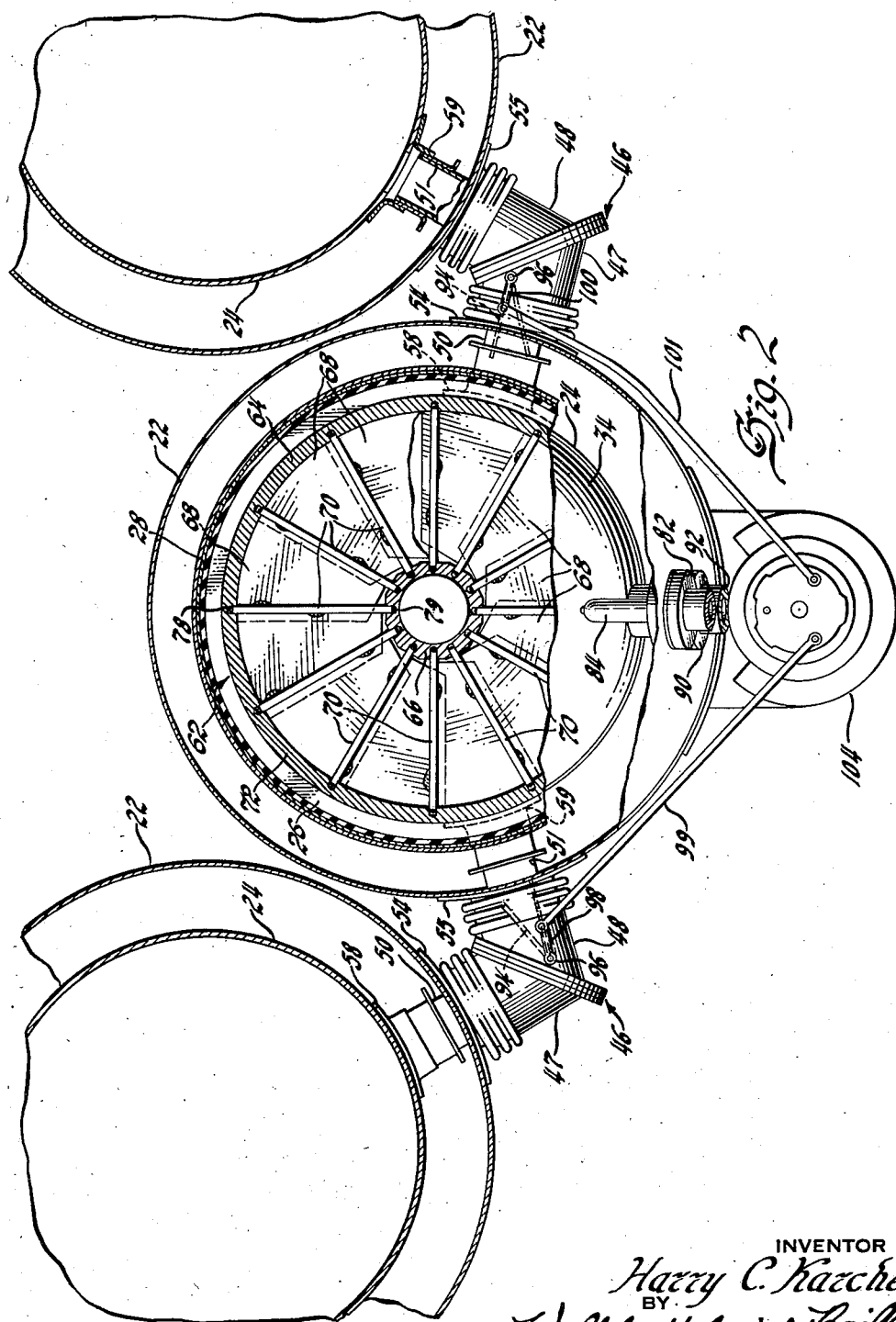

2,818,704

TURBINE ENGINE STARTING SYSTEM

Harry C. Karcher, Mansfield, Ohio, assignor to General Motors Corporation, Detroit, Mich., a corporation of Delaware Application October 30, 1952, Serial No. 317,805

12 Claims. (Cl. 60—39.14)

This invention relates to gas turbine engines and, more particularly, to starting means especially suited for gas turbine aircraft engines.

The greater part of the power developed by gas turbine engines of the type comprising a compressor, a combustion section, a turbine and a propulsive exhaust nozzle is utilized to drive the compressor which supplies a sufficient quantity of air to support the combustion process in the combustion apparatus for powering the engine, the remainder of the developed power issuing from the turbine exhaust as a propulsive jet for propelling the aircraft. By reason of their high rotational speed and power requirements, such engines present serious problems in respect to the starting thereof. Such engines are usually started by an air or an electric starting motor that is connected through suitable gearing to the shaft of the engine. Large engine installations may require a starting motor having a capacity of 300 horse-power or more to crank the engine, as a result of which the starter is of relatively large size and of heavy construction. There is presented the further problem of providing a source of power, electrical or compressed air, for energizing the starter. In the case of air starters, for example, a shop air line generally is employed to supply the necessary quantity of compressed air to actuate the motor. Often, such a power supply source is not available. The desirability of providing an integral and self-contained type of starting apparatus carried by the engine is, therefore, apparent. Such apparatus must, of necessity, be light in weight and yet of sufficient capacity to supply the necessary power to promote the initial rotation of the turbine for starting of the engine.

Accordingly, it is the general object of the present invention to provide suitable starting apparatus for the accomplishment of the above ends and, more specifically, to provide a starting apparatus which is simple, light, inexpensive, which supplies sufficient power to initiate starting of the engine, and which is integral with and may be readily incorporated in existing engine structures with little or no modification thereof.

In accordance with the present invention, a pressure actuated valve, responsive to the directions of air or gas flow through the engine, is provided in the inlet preferably of one of the combustion chambers of the combustion apparatus of a gas turbine engine so as to form a rocket-type starter chamber therein. The valve, which normally is maintained in its open position by the rearwardly directed flow of air from the compressor when the engine is running, is caused to close and block the inlet to the starter chamber by the momentary reverse flow resulting from the back pressure produced by the ignition of a suitable rocket propellant, which may comprise a combustible charge containing fuel and compressed oxygen, that is injected into the starter chamber. The highly heated and greatly expanded combustion products, resulting from the blast produced upon ignition of the combustible propellant introduced into the rocket chamber, will contain sufficient energy to cause the initial rotation of the engine. The main fuel supply system and ignition system of the engine then may be activated, after which time the injection of fuel and compressed oxygen into the rocket chamber is stopped and the valve in the inlet of the combustion chamber caused to open by the normally rearwardly directed flow accompanying the build-up of pressure in the turbine-driven compressor.

Figure 1 is a longitudinal sectional view of a portion of one of the combustion chambers of a gas turbine engine employing starting means in accordance with a preferred embodiment of the present invention;

Figure 2 is a transverse sectional view, with parts broken away, taken in the plane 2—2 of Figure 1;

Figure 3 is a sectional view through one of the crossover connections employed in Figure 2; and Figure 4 is a schematic electrical diagram of an electric control circuit suitable for use in the present invention.

Referring to the drawings, Fig. 1 illustrates a portion of a gas turbine engine in the vicinity of the combustion apparatus thereof and comprises a portion of the engine midframe 10 and the forward portion of one of the combustion chambers 12 of a gas turbine engine which embodies a starting system in accordance with the present invention.

The midframe 10, which is a structural support member for the engine, is positioned between the discharge end of the compressor and the inlet to the combustion apparatus of the engine and contains an annular diffuser passage 14 between the spaced outer and inner walls 16 and 18, respectively, thereof through which compressed air is supplied from the compressor to the combustion chambers. The compressor and turbine sections of the engine have been omitted in the interest of clarity of the drawings and conciseness of the specification, as there is nothing special in their respective designs so far as the present invention is concerned, and may be of types well known in the art.

The combustion chambers 12, which extend between the midframe 10 and the turbine section of the engine, are disposed in a circular array about the axis of the engine, as shown in Fig. 2. Each of the chambers 12 is constituted by a substantially cylindrical outer casing 22 and an inner casing or burner 24 concentrically disposed therein. The outer casing 22 of each chamber is open at its forward end which is provided with a flange 26 that is fastened by means of a ring clamp 28 to a flange 30 provided on each of respective ones of a plurality of circular openings formed in an annular end plate or bulkhead 32 at the after end of the midframe 10. Each of the burners 24 is perforated for the admission of air therein and is provided with a dome shaped member 34 at its forward end, as shown in Fig. 1. A primary fuel spray nozzle 36, which is supported from a mounting pad 38 fastened over an opening 40 formed in the outer wall 16 of the midframe, extends into the diffuser passage 14 and has a spray tip 42 thereon, which is centrally received in the dome-shaped member 34 of the burner 24. Each primary fuel spray nozzle 36 is connected through a line 43 without the engine to the main fuel supply source.

Customary elbow-shaped cross-over connections 46 are provided between adjacent combustion chambers to aid in promoting and maintaining ignition in the engine combustion chambers, as igniter plugs may not be provided in each of the individual chambers. As shown in Fig. 3, each cross-over connection comprises a pair of obliquely oriented outer tubes 47, 48 and a pair of inner tubes 50, 51 concentrically disposed within the outer tubes. The outer tubes 47, 48 extend between the outer casings 22 of a pair of adjacent combustion chambers and are provided with flanged fittings 54, 55 at one end of each tube which fittings are welded over openings in the outer casings of the combustion chambers, as illustrated in Fig. 2. The inner tubes 50, 51, through which communication between the burners 24 of adjacent combustion chambers is established, are provided with flanged fittings 58, 59, similar to 54, 55 and are welded over openings formed in the surface of the burners of the combustion chambers, substantially as shown.

In accordance with the invention, the starting of the engine is based on a rocket principle. One of the combustion chambers of the engine is converted into a rocket chamber by providing a pressure-actuated flow-responsive valve 62 that blocks or closes the inlet thereto from the compressor when a suitable rocket propellant, comprising a combustible charge of fuel and liquid oxygen, is introduced and ignited in the chamber.

The pressure or flow responsive inlet valve is formed by an outer ring 64 concentrically disposed about an inner ring 66 and an arrangement of radial shutter flaps or vanes 68 in the form of thin segmented plates shaped generally as shown in Fig. 2. One of the radial sides of each vane is welded to a separate length of rod 70 the ends of which serve as pivots and are mounted between the outer and inner rings 64 and 66. The outer ring 64 has a circumferential rib or flange 72 thereon, which is received in the counterbored faces of the flanges 26 and 30 of the outer casing 22 of the combustion chamber 12 and the midframe 10.

The inner ring 66 of the inlet valve assembly 62 is preferably of polygonal cross-section, as shown in Fig. 2, and the innermost side of each of the vanes 68 is shaped to conform closely to the flat or outer face of the inner ring adjacent the vane in order to minimize leakage thereby when the inlet valve is closed. The inner ring 66 is inserted over the spray tip 42 of the primary fuel spray nozzle 36 and is provided with an integrally formed bayonet clip 74 which engages an annular flange 76 on the body portion of the spray nozzle. The rods 70 of the shutter flaps or vanes 68 of the valve mechanism are received in a number of spaced radial openings 78, 79 provided in the inner and outer rings 64 and 66 and are rotatable therein from an open position, as shown in dashed outline in Fig. 1, to a closed position as shown in Fig. 2 in which the vanes or flaps 68 are prevented from further rotational movement by reason of their overlapping relation.

An auxiliary fuel injector nozzle 82, fastened to the outer casing 22 of the rocket starter chamber, has the spray tip 84 thereof extending into the dome 34 of the burner 24. The portion of the injector nozzle without the starter chamber has a pair of openings therein which are adapted to receive suitable fittings or couplings 86, 88 that are connected to a suitable source or sources supplying supplementary fuel and liquid oxygen, which are mixed within the injector nozzle and the resulting admixture supplied as a combustible charge through the spray tip thereof into the starter chamber for starting the engine.

An igniter plug 90 fastened to and extending through the outer surface of the outer casing 22 of the rocket chamber, extends into the forward portion of the burner 24 in close proximity with the spray tip 84 of the auxiliary injector nozzle 82 and is connected to an electrical cable 92 from a suitable electrical ignition source for the purpose of igniting the mixed charged.

To prevent the combustion products resulting from the ignition of the combustible charge serving as the rocket propellant in the rocket chamber from passing through the aforesaid cross-over connections 46 into the combustion chambers adjacent the rocket or starter chamber, flap valves as 94 are provided in the inner tubes 50, 51 of the cross-over connections on each side of the rocket chamber, substantially as shown. The cross-over valves, which are shown in their open and closed positions by the dashed lines in Fig. 2 and the full and dashed lines, respectively, in Fig. 3, are pivoted at 96 and are connected through two pairs of articulated links 98, 99 and 100, 101, to a suitable actuating means 104, such as a rotary electric solenoid 104 of the type well-known in the art. One end of each of the short links 98, 100 is fastened to a flap valve pivot 96 and the other end pivotally connected to the adjacent end of its respective longer link 99 or 101 whose opposite ends are connected to the rotor of the solenoid.

Fig. 4 is an electrical wiring diagram of a suitable control system for the present invention and comprises a series connected arrangement of a battery 110 or equivalent electrical supply source, a manually operated S. P. S. T. switch 112 and a timer switch 114, the load side of which has connected thereto a number of parallel or shunt-connected circuits or branches, respectively, containing an ignition unit 116, the rotary solenoid 104, a solenoid operated valve 120 to control the flow of fuel from a supplementary fuel line 122 to a fuel line 124 which is connected to one of the couplings provided on the auxiliary fuel injector nozzle 82 of Fig. 1, an electric motor 128 coupled to drive an auxiliary or starter fuel pump 130 connected in the supplementary fuel line 122, and a solenoid operated valve 132 to control the flow of liquid oxygen from an oxygen line 134, which is connected to a suitable source of oxygen under pressure, to a line 136, which is connected to the other of the fittings or couplings provided on the auxiliary fuel injector nozzle 82. One side of the battery 110 and of each of the aforesaid shunt circuits is connected to ground, for completing each circuit. The timer switch 114, shown in functional block diagrammatic form, may have a timing cycle of from about 6 to 10 seconds and may be of the solenoid operated variety well known in the art. The ignition unit 116, also shown in box diagram form, contains the igniter plug 90 of Figs. 1 and 2 and may be of the same type as the main ignition circuit employed in turbojet engines of this character. The oxygen supply source, which is connected to line 134, may be obtained from the breathing oxygen tanks customarily carried by the aircraft.

In order to initiate the starting process, the switch 112 is closed to initiate the timing cycle and current is supplied simultaneously to the rotary solenoid 104 to close the cross-over connection flap valves 94, to the solenoid valves 120 and 132 to open the supplementary fuel line 122 and liquid oxygen line 134 and to the electric motor 128 to drive the auxiliary or starter fuel pump 130 in fuel line 122. A highly combustible mixture of fuel and liquid oxygen is then injected into the starter chamber and caused to be ignited by the igniter plug 90 which has been electrically energized upon closure of switch 112. The inlet valve vanes 68, which are orientated in radial axially extending planes before the engine is started, are caused to close suddenly by the momentary reverse or forwardly directed flow through the valve caused by the back pressure resulting from the explosive blast upon ignition of the combustible rocket charge and are held shut by the pressure of the explosive blast. The combustion products from the ignited admixture of fuel and liquid oxygen contain sufficient energy to cause the initial rotation of the turbine and within 6 to 10 seconds the engine will have attained its normal firing speed of from about 1500 to 2500 R. P. M. The timed control system then automatically shuts down to deenergize the ignition unit 116 and the rotary solenoid 104, which opens the cross-over valves. The motor 128 and the solenoid valves 120 and 132 also will be de-energized to stop the flow of fuel and liquid oxygen into the starter chamber. The rearward flow of air as the pressure is built up in the compressor will then be sufficient to rotate the shutter flaps 68 of the inlet valve to their normally open position. The main ignition and fuel supply system of the engine are caused to be activated preferably before the end of the starting interval, say at the expiration of three seconds from the closing of switch 112, in order to aid in the starting process and to take over the control of the engine at the expiration of the starting period. Since only a few of the turbine buckets around the periphery of the turbine wheel are subjected to the blast or hot stream from the rocket or starter chamber at any instant during the starting interval, the turbine operates in a partially immersed condition and safely can withstand temperatures in excess of two thousand degrees that is attained by the combustible rocket propellant for the 6 to 10 second interval of the starting process.

Although only one form of the invention has been described and illustrated, it is not to be limited thereto for various changes can be made therein by those skilled in the art that are still within the spirit and scope thereof.

What is claimed is:

1. In gas turbine engine comprising a turbine-driven compressor, a combustion apparatus supplied from said compressor and including a plurality of combustion chambers each having an air inlet communicating with said compressor, cross-over connections between adjacent ones of said combustion chambers, and means for starting said engine, the combination of means for closing said cross-over connections from one of said combustion chambers to the chambers adjacent thereto, means for introducing a combustible charge into said one chamber, means for igniting said combustible charge, and pressure-actuated means in the inlet of said one chamber responsive to the back pressure resulting from the ignition of said combustible charge for closing the inlet to said one chamber.

2. In a gas turbine engine comprising, a turbine-driven compressor, a combustion section supplied from said compressor including a plurality of combustion chambers each having an air inlet communicating with said compressor and cross-over connections between adjacent ones of said combustion chambers, and means for starting said engine, the combination of means for closing the said cross-over connections to one of said combustion chambers from the chambers adjacent thereto, means for injecting a combustible charge into said one combustion chamber, means for igniting said combustible charge, and flow-responsive valve means positioned in the inlet of said one chamber, said valve means being operatively positioned to open in response to air flow from said compressor to said combustion section and to close in response to reverse flow therethrough for shutting the inlet to said one chamber upon ignition of said combustible charge injected therein.

3. In a gas turbine engine comprising a turbine-driven compressor, a combustion apparatus supplied from said compressor and including a plurality of combustion chambers each having an air inlet communicating with said compressor and cross-over connections between adjacent ones of said combustion chambers, and means for starting said engine, the combination of valve means for closing the said cross-over connections to one of said chambers from the chambers adjacent thereto, injector means for introducing a combustible charge into said one chamber and igniter means in said one chamber for igniting said combustible charge, pressure-actuated check valve means positioned in the inlet of said one chamber and responsive to the back pressure resulting from the ignition of said combustible charge in said one chamber for shutting the inlet thereto, and means for opening said cross-over valve means to said one chamber and for closing the supply of combustible charge thereto a predetermined time after the introduction of said combustible charge therein.

4. In a gas turbine engine comprising a turbine-driven compressor, a combustion apparatus supplied from said compressor and including a plurality of combustion chambers each having an air inlet communicating with said compressor and cross-over connections between adjacent ones of said combustion chambers, and means for starting said engine, the combination of valve means for closing the cross-over connections to one of said chambers from the chambers adjacent thereto, means for injecting an admixture of fuel liquid oxygen into said one chamber, igniter means in said one chamber for igniting said admixture of fuel and oxygen introduced therein, a flow-responsive valve comprising a radial array of pivotable shutter flaps positioned in the inlet of said one chamber and responsive to the back pressure from the ignition of said admixture in said one chamber for shutting the inlet thereto, and control means operative to open said cross-over valve means to said one chamber and to stop the supply of fuel and liquid oxygen thereto a predetermined time after the introduction of said admixture into said one chamber.

5. In a gas turbine engine comprising a rotary compressor, a combustion section including a plurality of combustion chambers, an inlet casing defining a passage between said compressor and said combustion section through which said combustion chambers are supplied from said compressor, cross-over connections between adjacent ones of said combustion chambers, and means for starting said engine, the combination of valve means for closing the cross-over connections to one of said chambers from the chambers adjacent thereto positioned in said adjacent chambers, injector means for introducing a combustible charge into said one combustion chamber, ignitor means for igniting said charge, flow-responsive means comprising a radial array of pivotable overlapping shutter flaps positioned in the inlet of said one chamber and responsive to the back pressure resulting from the ignition of said combustible charge injected into said one chamber for shutting the inlet thereto during starting conditions, and electric circuit control means operative to open said cross-over valve means and to close the supply of combustible charge to said one chamber after starting the engine.

6. In a gas turbine engine comprising a rotary compressor, a combustion section, an inlet casing defining a passage between said compressor and said combustion section and a turbine powered from said combustion section for driving said compressor, said combustion section comprising an array of individual combustion chambers supplied from said compressor, each of said chambers including an outer chamber and a burner within said outer chamber and cross-over connections extending between the burners of adjacent ones of said individual chambers, and means for starting said engine, the combination of solenoid-operated valve means in the cross-over connections on both sides of one of said chambers, injector means extending into said one chamber for injecting an admixture of fuel and liquid oxygen therein, an igniter plug extending into said chamber for igniting said admixture, a pressure-actuated valve comprising a plurality of radial overlapping shutter flaps pivotally mounted in a transverse plane at the inlet to said one combustion chamber and responsive to the back pressure resulting from the ignition of said admixture of fuel and liquid oxygen in said one chamber for shutting the inlet thereto during starting of the engine, and timed electric circuit control means operative to open said cross-over valve means and the supply of fuel and liquid oxygen to said one chamber for a predetermined time interval during the starting of the engine.

7. In a gas turbine engine comprising a turbine-driven compressor, a combustion section having an inlet from said compressor and comprising a plurality of individual combustion chambers supplied from said compressor, cross-over connections extending between adjacent combustion chambers, means for injecting primary fuel into said combustion chambers, means for igniting said fuel, and means for starting said engine, the combination of valve means in the cross-over connections adjacent one of said chambers, flow-responsive valve means in the said inlet of said one combustion chamber and positioned to open in response to air flow from said compressor to the combustion section and to close in response to reverse flow therethrough, auxiliary means for supplying a starting combustible charge to said one combustion chamber, means for igniting said charge and electric circuit control means operative to open said cross-over connection valve means and the supply of said combustible charge to said one chamber for a predetermined time interval for starting of the engine by which time said engine will be powered solely from said primary fuel.

8. The combination in a gas turbine engine including a turbine-driven compressor, a combustion section having an inlet communicating with said compressor, and means for starting said engine, of; means for supplying a combustible charge to said combustion section, means for igniting said combustible charge, and pressure-actuated means for closing the inlet to said combustion section upon the ignition of said combusible charge, said pressure-actuated means comprising a control valve having radial array of pivotal overlapping shutter flaps positioned in the inlet of the said combustion section.

9. The combination in a gas turbine engine including a turbine-driven compressor, a combustion section having an inlet communicating with said compressor, means for injecting primary fuel into said combustion section, means for igniting said fuel, and means for starting said engine, of; a pressure-actuated valve in the said inlet of said combustion section and operatively positioned to open in response to air flow from said compressor to the combustion section and to close in response to reverse flow therethrough, auxiliary means for supplying a starting combustible charge to said combustion section and means for igniting said charge for starting said engine, said pressure-actuated valve comprising a radial array of pivotable overlapping shutter flaps.

10. In a gas turbine engine comprising a turbine-driven compressor, a combustion apparatus supplied from said compressor and including a plurality of combustion chambers each having an air inlet communicating with said compressor and passage defining means in communication with and interconnecting said combustion chambers, and means for starting said engine, the combination of valve means in said passage defining means for isolating one of said combustion chambers from the remaining chambers of said combustion apparatus, additional valve means in the inlet of said isolated combustion chamber for closing the inlet thereto, means for introducing a combustible charge into said isolated chamber and means for igniting said combustible charge therein for starting of said engine.

11. The combination in accordance with claim 10 above wherein said additional valve means comprises a radial array of pivotable overlapping shutter flaps.

12. The combination in a gas turbine engine including a turbine-driven compressor, a combustion section having an inlet communicating with said compressor, and means for starting said engine, of; means for supplying a combustible charge to said combustion section, means for igniting said combustible charge, and valve means for closing the inlet to said combustion section upon the ignition of said combustible charge comprising a control valve having radial array of pivotal overlapping shutter flaps positioned in the inlet of the said combustion section.

References Cited in the file of this patent
UNITED STATES PATENTS 2,469,678    Wyman _____ May 10, 1949

FOREIGN PATENTS 616,695    Great Britain _____ Jan. 26, 1949